United States Patent
Johnson et al.

(10) Patent No.: US 6,266,979 B1
(45) Date of Patent: Jul. 31, 2001

(54) SPINNER DISC ALLOY

(75) Inventors: Walter A. Johnson, Aurora; Gary W. Smiley; Robert Rushforth, both of Littleton, all of CO (US); John Strothers, Tucson, AZ (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 09/389,005

(22) Filed: Sep. 2, 1999

(51) Int. Cl.$^7$ .......................... C03B 37/095; C22C 19/05
(52) U.S. Cl. ................ 65/302; 65/515; 65/302; 420/437; 420/439; 420/588
(58) Field of Search ................. 65/515, 302; 420/436, 420/439, 588

(56) References Cited

U.S. PATENT DOCUMENTS

| | | | | |
|---|---|---|---|---|
| 3,366,478 | * | 1/1968 | Wheaton | 420/436 |
| 3,984,240 | * | 10/1976 | Costin | 65/515 |
| 4,618,474 | * | 10/1986 | Ohe et al. | 420/436 |
| 4,662,920 | * | 5/1987 | Coupland | 65/515 |
| 4,820,324 | * | 4/1989 | Gaul | 65/515 |

* cited by examiner

Primary Examiner—James Derrington
(74) Attorney, Agent, or Firm—John D. Lister

(57) ABSTRACT

Cobalt alloys are disclosed for use in the fabrication of spinner discs for fiberizing molten glass into fibers in rotary fiberizing processes. The cobalt alloys fall within the following ranges, in percentage by weight, Co 22.0–54.0; Cr 30.0–34.0; Ni 9.0–31.0; Mo 0.0–7.0; C 0.45–0.65; Si 0.25–1.0; Mn 0.30–0.80; precious metals (PM) 0.0–2.0; and carbide forming metals (CFM) 0.0–1.3.

11 Claims, 1 Drawing Sheet

SPINNER DISC ALLOY

BACKGROUND OF THE INVENTION

The present invention relates to a cobalt alloy for spinner discs used in rotary glass fiberization processes, and, in particular, to a cobalt alloy which extends the service life of spinner discs used in rotary glass fiberization processes or exhibits some other desirable property related to either the fabrication or use of such spinner discs.

Elevated temperature resistant cobalt alloys are typically used as the alloys for spinner discs in rotary glass fiberization processes. The cobalt alloys are used for this application because of the superior performance of such cobalt alloys in this application when compared to iron or nickel based alloys. The superior performance of the cobalt alloys is due to their higher strength and creep resistance at the elevated temperatures used in rotary glass fiberization processes and their greater corrosion resistance at the elevated temperatures used in rotary glass fiberization processes.

Cobalt alloys consist of a strong and corrosion resistant cobalt-chromium matrix (Co—Cr matrix), which is further strengthened, with a dispersion of coarse, strong carbides. The carbides in the microstructure are second phase strengtheners, the bulk of which are produced during the casting of the spinner disc in the solidification portion of the process. $Cr_{23}C_6$ represents the dominant carbide by volume. However, $Mo_xC_y$ carbides also form. These molybdenum carbides tend to be thermally stable, i.e. these molybdenum carbides melt at higher temperatures than the chromium carbides, yet the presence of molybdenum carbides can be extremely detrimental to certain hot corrosion, sulfidation environments, because molybdenum carbide alters the corrosion product chemistry and accelerates corrosion. Thus, while these molybdenum carbides impart improved elevated temperature strength to the cobalt alloys, the molybdenum carbides can accelerate attack in the existing short circuit path for oxidation, sulfidation and other forms of elevated temperature corrosion. The corrosion short circuiting is heavily impacted by near continuous morphology of the carbides. In addition, carbides have another detrimental characteristic, carbides are the last portion of the cobalt alloy microstructure to freeze on cooling and the first portion of the cobalt alloy microstructure to melt on heating. Hence, the phase in the cobalt alloy, relied upon for strength in the alloy, melts at the lowest temperature of the components forming the cobalt alloy.

The aforementioned characteristics of cobalt alloys, the structure-property-performance-process characteristics exhibited by different cobalt alloys, makes the development of new cobalt alloys with good high temperature corrosion and oxidation resistance property balanced with good high temperature mechanical strength very difficult. For example, chromium is a primary component for increasing the high temperature corrosion resistance of cobalt-chromium alloys. However, increasing the chromium content of a cobalt alloy beyond an optimum percentage of the alloy by weight will increase the volume fraction of carbides. This results in an imbalance in the desired physical properties for the cobalt alloy as there will be an increase in high temperature alloy strength but a decrease in alloy ductility. In addition, "excessive" carbides will generally reduce overall alloy corrosion resistance as there will be a greater volume of the short circuit carbide paths for corrosion. While the Co—Cr matrix of a cobalt alloy, with more than the optimum percentage by weight of chromium, can have good corrosion resistance, the Co—Cr matrix will tend to form weak and brittle $Co_xCr_y$ topologically close packed (TCP) phases due to the increase in electron vacancies trending the alloy from metallic bonding toward electron compounds. Thus, to be effective for a particular application, such as a spinner disc for the rotary fiberization of molten glass, the structure-property-performance-process properties of a cobalt alloy must be balanced for an optimum performance under the corrosive environmental conditions and the mechanical stresses encountered within the process envelope.

SUMMARY OF THE INVENTION

The structure-property-performance-process characteristics exhibited by the cobalt alloy of the present invention make the cobalt alloy of the present invention especially well suited for use in the fabrication of spinner discs for fiberizing molten glass into fibers in rotary fiberizing processes. The different embodiments of the cobalt alloy of the present invention were found to either extend the service life of spinner discs made from the cobalt alloy of the present invention beyond thirty hours, a benchmark service life for spinner discs under the process conditions tested, or demonstrated other desirable fabrication or performance attributes, such as relatively high ductility.

Different embodiments of the cobalt alloy of the present invention were tested for tensile strength at room temperature and at the elevated temperatures which would be encountered by spinner discs made from the alloys. These tests were performed to assure that the alloys exhibited: a) sufficient strength and ductility at room temperature to survive the harsh thermal shock encountered by a spinner disk at process start-up; and b) the required elevated temperature yield and ultimate tensile strengths for spinner discs operating at the elevated temperatures encountered in a rotary, glass fiberizing process. The different embodiments of the cobalt alloy of the present invention exhibited sufficient strength and ductility at room temperature, as well as, good elevated temperature yield and ultimate tensile strengths.

Chromium is used in the different embodiments of the cobalt alloy of the present invention to increase the cobalt alloy's inherent nobility or corrosion resistance and increased the alloys' thermodynamic ability to form and reform a protective oxide film, i.e. a strong, thin and continuous $Cr_2O_3$ barrier film. Different embodiments of the alloy of the present invention were tested for corrosion resistance and exhibit good corrosion resistance in molten glass, e.g. a molten glass at a temperature of about 1800° F. to about 2000° F.

The compositions of the cobalt alloy of the present invention fall within the following ranges, in percentage by weight cobalt (Co) 22.0–54.0; chromium (Cr) 30.0–34.0; nickel (Ni) 9.0–31.0; molybdenum (Mo) 0.0–7.0; carbon (C) 0.45–0.65; silicon (Si) 0.25–1.0; manganese (Mn) 0.30–0.80; precious metals (PM) 0.0–2.0; and carbide forming metals (CFM) 0.0–1.3.

DESCRIPTION OF THE PREFERRED EMBODIMENTS

Figure 1:
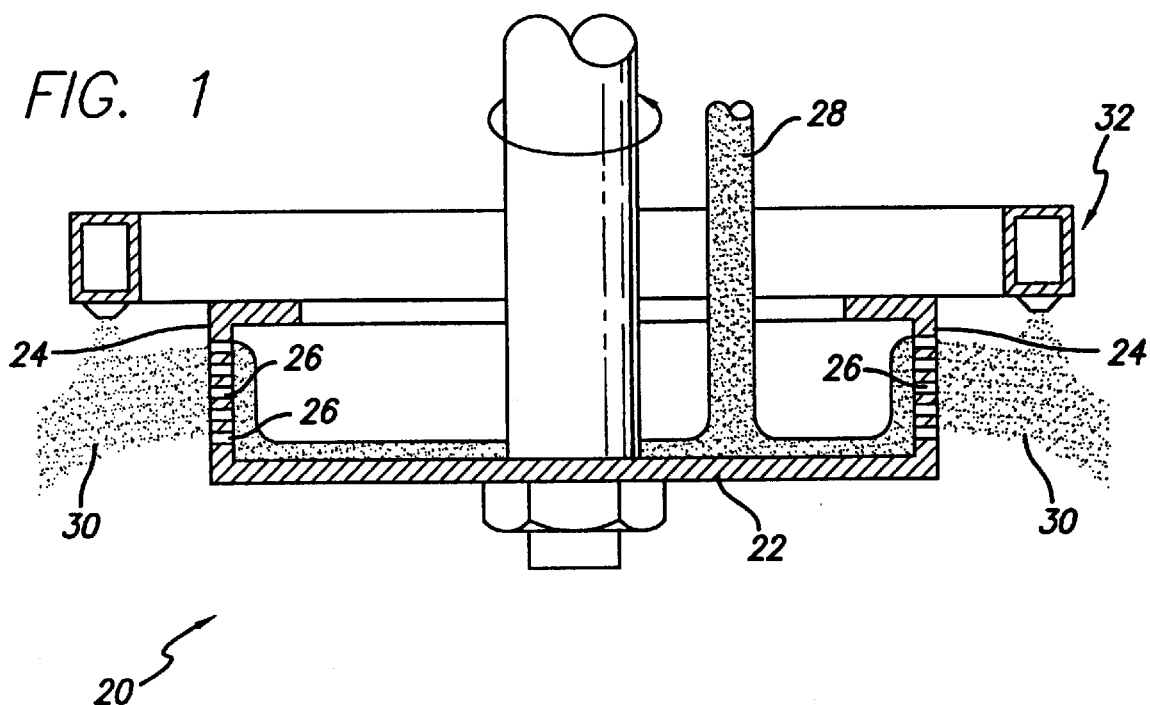
FIG. 1 is a schematic vertical section through a fiberizing station for fiberizing molten glass.

The cobalt alloy of the present invention is especially suited for use in the fabrication of spinner discs for fiberizing molten glass into fibers in rotary fiberizing processes. As shown in FIG. 1, a spinner disc 20 for fiberizing molten glass in a rotary fiberizing process typically has a bottom disc plate 22 and an annular peripheral sidewall 24 integral with and extending upward from the bottom disc plate. The annular peripheral sidewall 24 has a plurality of rows of fiberizing holes 26 therein through which molten glass 28 is passed by centrifugal force to form glass fibers 30. Typically, the fibers 30 produced by passing the molten glass through the rows of fiberizing holes 26 in the spinner disc 20 are further attenuated by an annular curtain of hot, high velocity products of combustion and/or a high velocity annular curtain of air, steam, etc., discharged from an annular burner or manifold assembly and/or an annular air ring 32.

The compositions of the cobalt alloy of the present invention fall within the following ranges, in percentage by weight, cobalt (Co) 22.0–54.0; chromium (Cr) 30.0–34.0; nickel (Ni) 9.0–31.0; molybdenum (Mo) 0.0–7.0; carbon (C) 0.45–0.65; silicon (Si) 0.25–1.0; manganese (Mn) 0.30–0.80; precious metals (PM) 0.0–2.0; and carbide forming metals (CFM) 0.0–1.3. As used herein, including the claims, the term "precious metals" or "PM" means precious metals and rare earth elements and combinations thereof, such as but are not limited to, the following precious metals: ruthenium (Ru), rhodium (Rh), palladium (Pd), silver (Ag), platinum (Pt), gold (Au), and iridium (Ir) and the following rare earth metals: cerium (Ce), lanthanum (La), praseodymium (Pr), Yttrium (Y), and neodymium (Nd). As used herein, including the claims, the term "carbide forming metals" or "CFM" means carbide forming metals and combinations thereof, such as but not limited to, titanium (Ti), niobium (Nb), wolfram or tungsten (W), zirconium (Zr), hafnium (Hf), tantalum (ta), and vanadium (V).

One embodiment of the cobalt alloy of the present invention includes and, preferably, consists essentially of the following components:

| | |
|---|---|
| Co | 22.0–40.0 |
| Cr | 30.0–34.0 |
| Ni | 29.0–31.0 |
| Mo | 0.0–6.0 |
| C | 0.45–0.60 |
| Si | 0.25–1.0 |
| Mn | 0.30–0.80 |
| PM | 0.0–2.0 |
| CFM | 0.0–1.30 | in percentage by weight. This cobalt alloy either exhibited very good ductility or when tested, spinner discs made from this cobalt alloy exhibited significantly greater service life than the thirty (30) hour benchmark service life. In this first embodiment of the cobalt alloy of the present invention, several alloy compositions exhibited particularly significant properties related to the fabrication and/or service life of spinner discs made from the cobalt alloy.

A first composition of the cobalt alloy of the present invention (Alloy I) includes and preferably, consists essentially of:

| | |
|---|---|
| Co | 32.0–40.0 |
| Cr | 30.0–34.0 |
| Ni | 29.0–31.0 |
| C | 0.40–0.50 |
| Si | 0.25–1.0 |
| Mn | 0.30–0.80 | in percentage by weight with the Co preferably being present between 36.0–39.0 in percentage by weight. This cobalt alloy exhibited very good ductility and, as shown in Table I below, a good yield strength and ultimate tensile strength at both 1800° F. 2000° F. As shown in Table II below, the alloy also exhibited good corrosion resistance and, as shown in Table III below, the average service life of spinner discs made from this cobalt alloy was about 29 hours which is about equal to the benchmark service life and an acceptable life span for such spinner discs.

A second composition of the cobalt alloy of the present invention (Alloy II) includes and preferably, consists essentially of:

| | |
|---|---|
| Co | 32.0–39.0 |
| Cr | 30.0–34.0 |
| Ni | 29.0–31.0 |
| C | 0.55–0.65 |
| Si | 0.25–1.0 |
| Mn | 0.30–0.80 |
| Ti | 0.10–0.20 |
| Nb | 0.30–0.40 |
| W | 0.50–0.70 | in percentage by weight with the Co preferably being present between 36.0–39.0 in percentage by weight. This cobalt alloy, as shown in Table I, exhibited a good yield strength and ultimate tensile strength at both 1800° F. and 2000° F. As shown in Table II, this cobalt alloy exhibited a corrosion resistance somewhat better than that exhibited by Alloy I and as shown in Table III, the average service life of spinner discs made from this cobalt alloy was 47 hours which is significantly better than the benchmark service life for such spinner discs, i.e. a service life better than 50% longer.

A third composition of the cobalt alloy of the present invention (Alloy II) includes and preferably, consists essentially of:

| | |
|---|---|
| Co | 22.0–32.0 |
| Cr | 30.0–34.0 |
| Ni | 29.0–31.0 |
| Mo | 5.0–7.0 |
| C | 0.40–0.50 |
| Si | 0.25–1.0 |
| Mn | 0.30–0.80 |
| Ru | 1.5–2.5 |
| Ti | 0.10–0.20 |
| Nb | 0.30–0.40 |
| W | 0.50–0.70 | in percentage by weight with the Co preferably being present between 27.0–32.0 in percentage by weight. This cobalt alloy, as shown in Table I, exhibited good yield strength and ultimate tensile strength at both 1800° F. and at 2000° F. Although, as shown in Table II, this cobalt alloy exhibited a corrosion resistance below that of the Alloys I and 11, due to the balance of structure-property-performance-process characteristics of this alloy, the average service life of spinner discs made from this cobalt alloy, as shown in Table III, was 48 hours which is significantly better than the benchmark service life for such spinner discs, e.g. a service life better than 50% longer, and comparable to the service life of spinner discs made from Alloy II.

A fourth composition of the cobalt alloy of the present invention (Alloy IV) includes and preferably, consists essentially of:

| | |
|---|---|
| Co | 23.0–33.0 |
| Cr | 30.0–34.0 |
| Ni | 29.0–31.0 |
| Mo | 5.0–7.0 |
| C | 0.55–0.65 |
| Si | 0.25–1.0 |
| Mn | 0.30–0.80 |
| Ru | 1.5–2.5 | in percentage by weight with the Co preferably being present between 27.0–32.0 in percentage by weight. This cobalt alloy, as shown in Table I, exhibited a good yield strength and ultimate tensile strength at both 1800° F. and at 2000° F. In addition, as shown in Table II, this cobalt alloy also exhibited a very good corrosion resistance; and as shown in Table III, the average service life of spinner discs made from this cobalt alloy was 48 hours which is significantly better than the benchmark service life for such spinner discs, e.g. a service life better than 50% longer and comparable to the service life of spinners made from Alloys II and III.

Another embodiment of the cobalt alloy of the present invention (Alloy V) includes and, preferably, consists essentially of the following components:

| | |
|---|---|
| Co | 44.0–54.0 |
| Cr | 30.0–34.0 |
| Ni | 9.0–11.0 |
| Mo | 5.0–7.0 |
| C | 0.55–0.65 |
| Si | 0.25–1.0 |
| Mn | 0.30–0.80 |
| Ti | 0.10–0.20 |
| Nb | 0.30–0.40 |
| W | 0.50–0.70 | in percentage by weight with the Co preferably being present between 49.0–54.0 in percentage by weight. This cobalt alloy, as shown in Table I, exhibited a good yield strength and ultimate tensile strength at both 1800° F. and 2000° F. As shown in Table II, this cobalt alloy exhibited good corrosion resistance. As shown in Table III, like the service lives of spinner discs made from Alloys II, III and IV, the average service life of spinner discs made from this cobalt alloy was 51 hours which is significantly better than the benchmark service life for such spinner discs made, e.g. a service life better than 60% longer.

The yield strengths and the ultimate tensile strengths of Alloys I to V of the present invention were tested at temperatures of 1800° F. and 2000° F. approximating the operating temperatures encountered in rotary glass fiberizing processes. The results of these tests are set forth in Table I where "YS (psi)" is yield strength in pounds per square; "UTS (psi)" is ultimate tensile strength in pounds per square inch; "% El" is percent elongation at breakage or separation of the test sample; and "% RA" is percent reduction in area of cross section at breakage or separation of the test sample.

TABLE I

| ALLOY | TEMP. ° F. | YS (psi) | UTS (psi) | % EL | % RA |
|---|---|---|---|---|---|
| Alloy I | 1800 | 12,700 | 20,700 | 18 | 23 |
| | 2000 | 10,700 | 12,900 | 33 | 51 |
| Alloy II | 1800 | 13,200 | 20,300 | 58 | 53 |
| | 2000 | 8,500 | 12,400 | 41 | 56 |

TABLE I-continued

| ALLOY | TEMP. ° F. | YS (psi) | UTS (psi) | % EL | % RA |
|---|---|---|---|---|---|
| Alloy III | 1800 | 15,400 | 29,500 | 32 | 50 |
| | 2000 | 10,900 | 15,700 | 39 | 59 |
| Alloy IV | 1800 | 18,900 | 30,300 | 32 | 45 |
| | 2000 | 9,800 | 16,800 | 32 | 56 |
| Alloy V | 1800 | 17,800 | 34,000 | 33 | 35 |
| | 2000 | 11,800 | 18,200 | 30 | 52 |

Alloys I to V of the present invention were tested for corrosion resistance by immersing cylindrical test bars of the various alloy compositions in molten glass heated to a temperature of about 1900° F. to about 1950° F. and stirring the test bars for a specific length of time, i.e. 6 hours. The test bars were then removed from the molten glass and the surface area loss in cross section of each test bar was compared with the initial surface area in cross section of the test bar. Surface area loss has a direct correlation with corrosion resistance with less surface area loss corresponding to greater corrosion resistance. A benchmark alloy used in the fabrication of spinner disks and subjected to the above described test had a 5.7 percent loss in surface area.

TABLE II

| ALLOY | PERCENTAGE LOSS SURFACE AREA |
|---|---|
| Alloy I | 3.7 |
| Alloy II | 3.0 |
| Alloy III | 8.3 |
| Alloy IV | 2.3 |
| Alloy V | 6.0 |

The service life of spinner discs made from Alloys I to V of the present invention were compared under production conditions.

TABLE III

| ALLOY | AVERAGE SERVICE LIFE IN HOURS |
|---|---|
| Alloy I | 29 |
| Alloy II | 47 |
| Alloy III | 48 |
| Alloy IV | 48 |
| Alloy V | 51 |

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A spinner disc for fiberizing molten glass in a rotary fiberizing process at temperatures of 1800° F. to 2000° F.; the spinner disc having a bottom disc plate and an annular peripheral sidewall integral with and extending upward from the bottom disc plate which has a plurality of fiberizing holes therein through which molten glass is passed by centrifugal force to form glass fibers; the spinner disc being made of an alloy consisting essentially of:

| | |
|---|---|
| Co | 22.0–40.0 |
| Cr | 30.0–34.0 |
| Ni | 29.0–31.0 |
| Mo | 0.0–6.0 |
| C | 0.45–0.60 |
| Si | 0.25–1.0 |
| Mn | 0.30–0.80 |
| PM | 0.0–2.0 |
| CFM | 0.0–1.30 | in percentage by weight.

2. The spinner disc according to claim 1, wherein:
the alloy consists essentially of

| | |
|---|---|
| Co | 32.0–40.0 |
| Cr | 30.0–34.0 |
| Ni | 29.0–31.0 |
| C | 0.40–0.50 |
| Si | 0.25–1.0 |
| Mn | 0.30–0.80 | in percentage by weight.

3. The spinner disc according to claim 2, wherein:
the Co is present in an amount of 36.0–39.0 in percentage by weight.

4. The spinner disc according to claim 1, wherein:
the alloy consists essentially of

| | |
|---|---|
| Co | 32.0–39.0 |
| Cr | 30.0–34.0 |
| Ni | 29.0–31.0 |
| C | 0.55–0.65 |
| Si | 0.25–1.0 |
| Mn | 0.30–0.80 |
| Ti | 0.10–0.20 |
| Nb | 0.30–0.40 |
| W | 0.50–0.70 | in percentage by weight.

5. The spinner disc according to claim 4, wherein:
the Co is present in an amount of 36.0–39.0 in percentage by weight.

6. The spinner disc according to claim 1, wherein:
the alloy consists essentially of

| | |
|---|---|
| Co | 22.0–32.0 |
| Cr | 30.0–34.0 |
| Ni | 29.0–31.0 |
| Mo | 5.0–7.0 |
| C | 0.40–0.50 |
| Si | 0.25–1.0 |
| Mn | 0.30–0.80 |
| Ru | 1.5–2.5 |
| Ti | 0.10–0.20 |
| Nb | 0.30–0.40 |
| W | 0.50–0.70 | in percentage by weight.

7. The spinner disc according to claim 6, wherein:
the Co is present in an amount of 27.0–32.0 in percentage by weight.

8. The spinner disc according to claim 1, wherein:
the alloy consists essentially of

| | |
|---|---|
| Co | 23.0–33.0 |
| Cr | 30.0–34.0 |
| Ni | 29.0–31.0 |
| Mo | 5.0–7.0 |
| C | 0.55–0.65 |
| Si | 0.25–1.0 |
| Mn | 0.30–0.80 |
| Ru | 1.5–2.5 | in percentage by weight.

9. The spinner disc according to claim 8, wherein:
the Co is present in an amount of 27.0–32.0 in percentage by weight.

10. A spinner disc for fiberizing molten glass in a rotary fiberizing process at temperatures of 1800° F. to 2000° F.; the spinner disc having a bottom disc plate and an annular peripheral sidewall integral with and extending upward from the bottom disc plate which has a plurality of fiberizing holes therein through which molten glass is passed by centrifugal force to form glass fibers; the spinner disc being made of an alloy consisting essentially of:

| | |
|---|---|
| Co | 44.0–54.0 |
| Cr | 30.0–34.0 |
| Ni | 9.0–11.0 |
| Mo | 5.0–7.0 |
| C | 0.55–0.65 |
| Si | 0.25–1.0 |
| Mn | 0.30–0.80 |
| Ti | 0.10–0.20 |
| Nb | 0.30–0.40 |
| W | 0.50–0.70 | in percentage by weight.

11. The spinner disc according to claim 10, wherein:
the Co is present in an amount of 49.0–54.0 in percentage by weight.

* * * * *